United States Patent
Lee et al.

(10) Patent No.: US 10,644,382 B2
(45) Date of Patent: May 5, 2020

(54) ANTENNA ASSEMBLY AND WIRELESS COMMUNICATION DEVICE EMPLOYING SAME

(71) Applicant: Chiun Mai Communication Systems, Inc., New Taipei (TW)

(72) Inventors: Yi-Chieh Lee, New Taipei (TW);
Yen-Hui Lin, New Taipei (TW);
Yun-Jian Chang, New Taipei (TW);
Jung-Chin Lin, New Taipei (TW);
Geng-Hong Liou, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 62 days.

(21) Appl. No.: 16/137,567

(22) Filed: Sep. 21, 2018

(65) Prior Publication Data

US 2019/0131694 A1     May 2, 2019

(30) Foreign Application Priority Data

Oct. 30, 2017     (CN) .......................... 2017 1 1035888

(51) Int. Cl.
| | | |
|---|---|---|
| *H01Q 1/48* | (2006.01) | |
| *H01Q 1/24* | (2006.01) | |
| *H04M 1/02* | (2006.01) | |
| *H01Q 13/10* | (2006.01) | |
| *H01Q 7/00* | (2006.01) | |
| *H01Q 5/335* | (2015.01) | |
| *H01Q 9/42* | (2006.01) | |
| *H01Q 5/35* | (2015.01) | |
| *H01Q 21/06* | (2006.01) | |
| *H01Q 9/04* | (2006.01) | |

(52) U.S. Cl.
CPC ............... *H01Q 1/243* (2013.01); *H01Q 1/48* (2013.01); *H01Q 5/335* (2015.01); *H01Q 7/00* (2013.01); *H01Q 9/42* (2013.01); *H01Q 13/10* (2013.01); *H04M 1/0283* (2013.01); *H01Q 5/35* (2015.01); *H01Q 9/0421* (2013.01); *H01Q 21/064* (2013.01)

(58) Field of Classification Search
CPC .......... H01G 1/243; H01G 5/335; H01G 1/48; H01G 7/00; H01G 9/42; H01G 13/10; H01G 5/35; H01G 9/0421; H01G 21/064
See application file for complete search history.

(56) References Cited

FOREIGN PATENT DOCUMENTS

| CN | 204289710 U | 4/2015 |
|---|---|---|
| CN | 204885437 U | 12/2015 |
| CN | 103219582 B | 8/2016 |
| WO | 2017156906 A1 | 9/2017 |

*Primary Examiner* — Graham P Smith
(74) *Attorney, Agent, or Firm* — ScienBiziP, P.C.

(57) ABSTRACT

An antenna assembly includes a side frame, a feed portion, a ground portion, a radiating portion, and a first matching circuit. The side frame defines a first gap to form a first radiating section from the first gap to a side portion. The radiating portion is inside the side frame and connects to the feed portion and the ground portion, the radiating portion is spaced apart from the side frame and connected to the first radiating section. One end of the first matching circuit connects to an end of the first radiating section adjacent to the first gap, another end connects to the ground portion. The feed portion feeds current into the radiating portion, two opposites ends of the first radiating section and the first matching circuit to activate radiating signals in a first frequency band. A wireless communication device employing the antenna assembly is also provided.

20 Claims, 10 Drawing Sheets

ANTENNA ASSEMBLY AND WIRELESS COMMUNICATION DEVICE EMPLOYING SAME

FIELD

The subject matter herein generally relates to an antenna assembly and a wireless communication device employing the antenna assembly.

BACKGROUND

Wireless communication devices may include a metal backboard designed to strengthen the structure of device and improve heat dissipation, but a metal backboard may act as an electromagnetic shield over an antenna assembly in the wireless communication device, thus affecting antenna performance. In addition, the backboard may define slots and gaps, which may affect its completeness, structural integrity and appearance.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. The term "comprising," when utilized, means "including, but not necessarily limited to"; it specifically indicates open-ended inclusion or membership in the so-described combination, group, series, and the like.

Figure 1:
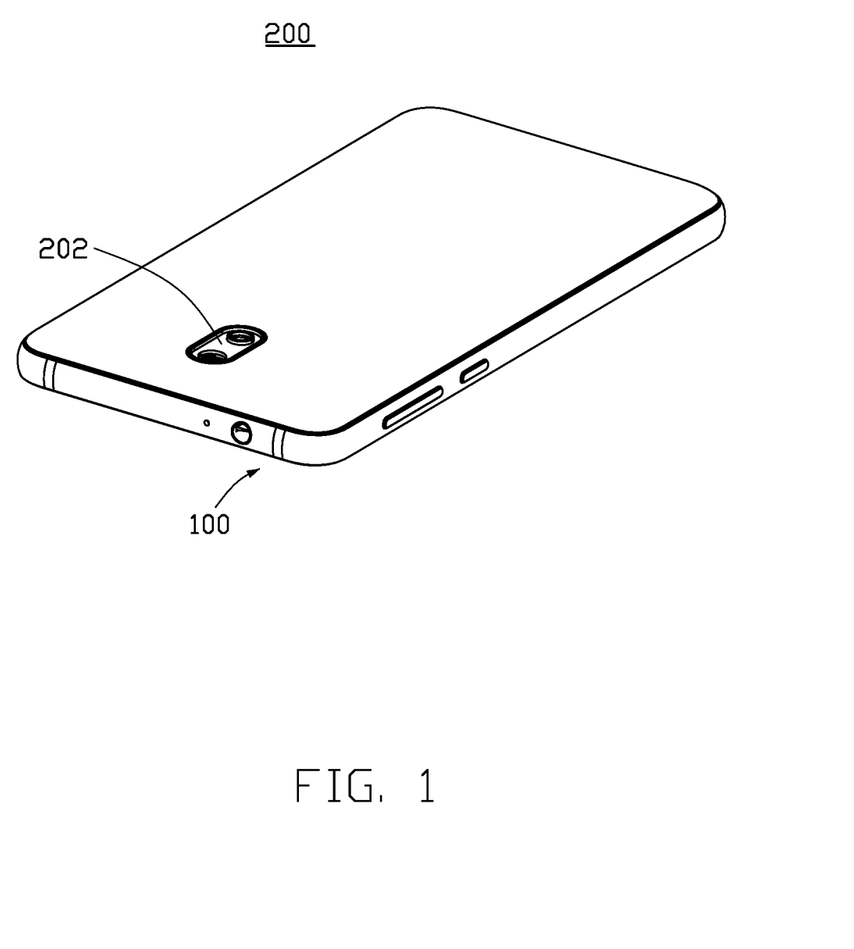
FIG. 1 is an isometric view of a first embodiment of a wireless communication device employing an antenna assembly.

FIG. 1 illustrates an embodiment of an antenna assembly 100 applied in a wireless communication device 200. The wireless communication device 200 can be a mobile phone, a tablet computer, or a PDA for transmitting and receiving wireless signals.

Figure 2:
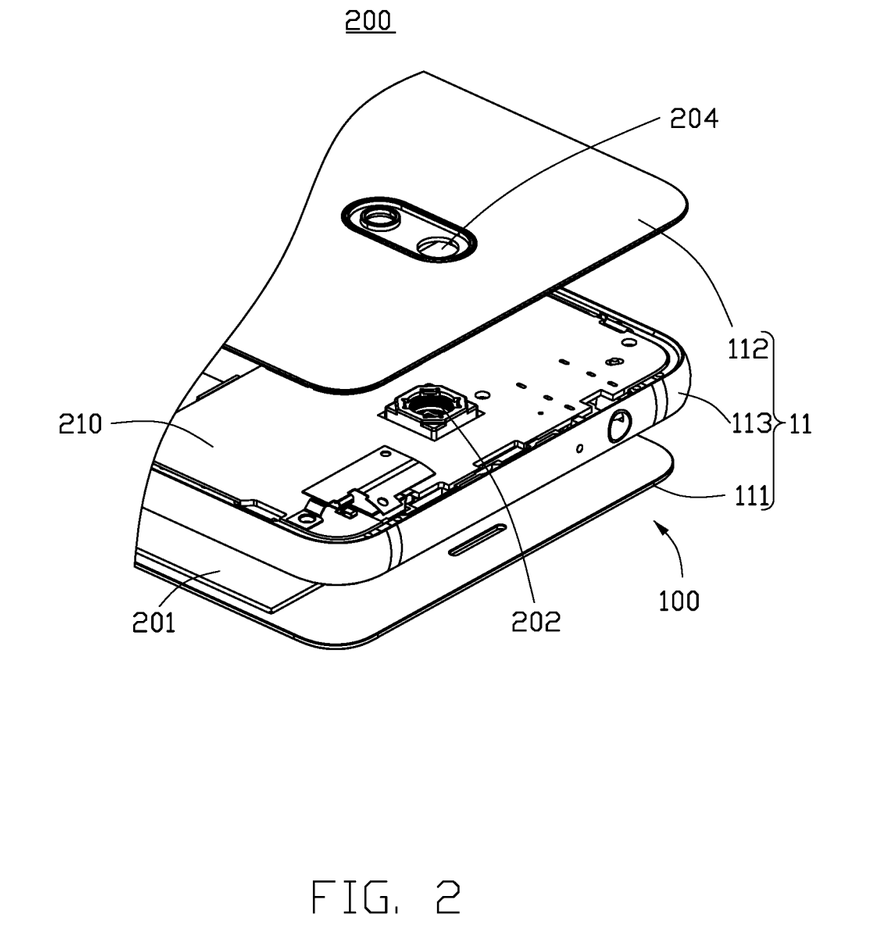
FIG. 2 is an exploded perspective view of the wireless communication device employing the antenna assembly.
Figure 3:
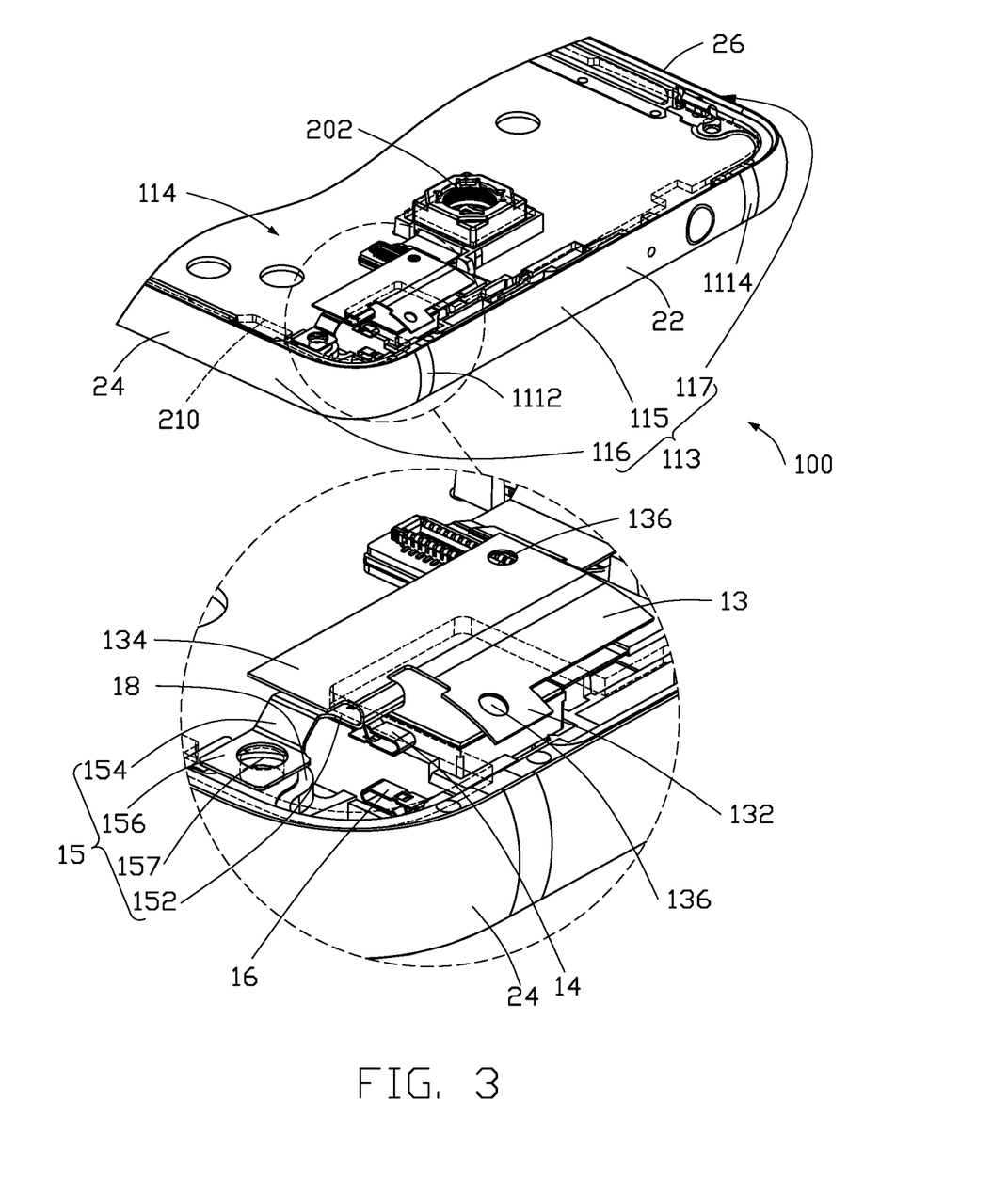
FIG. 3 is a partially assembled view of an antenna assembly.
Figure 4:
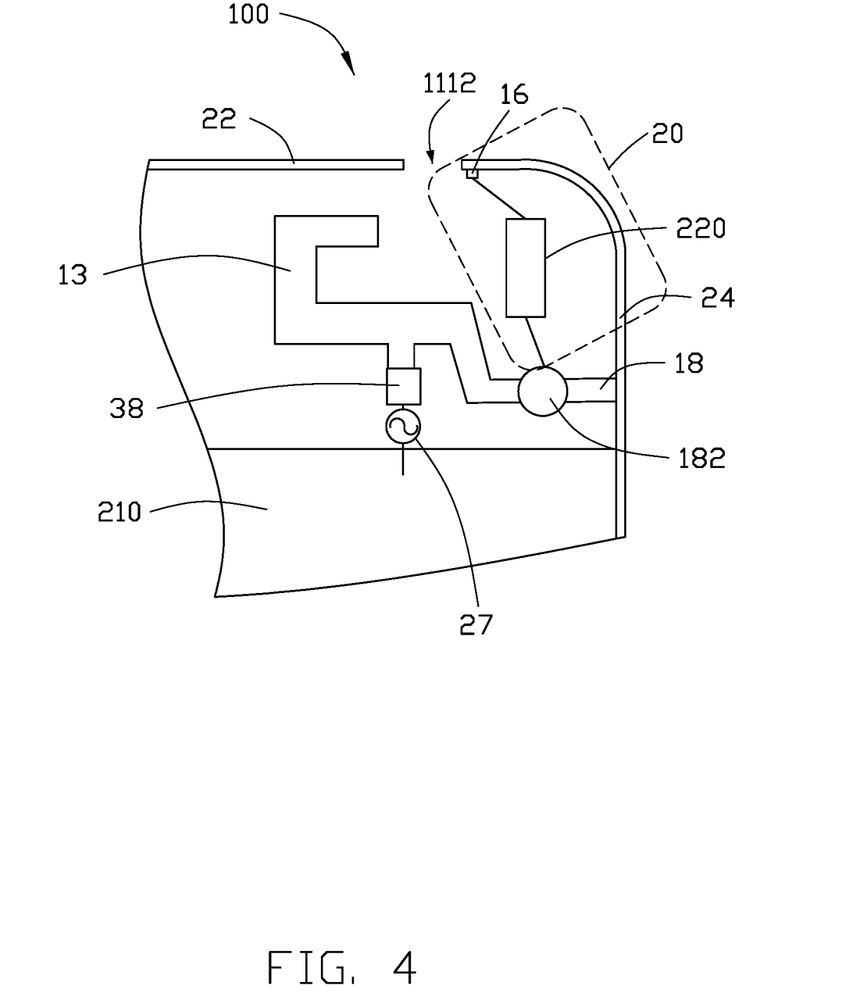
FIG. 4 is a partial plan view of the antenna assembly shown in FIG. 3.
Figure 5:
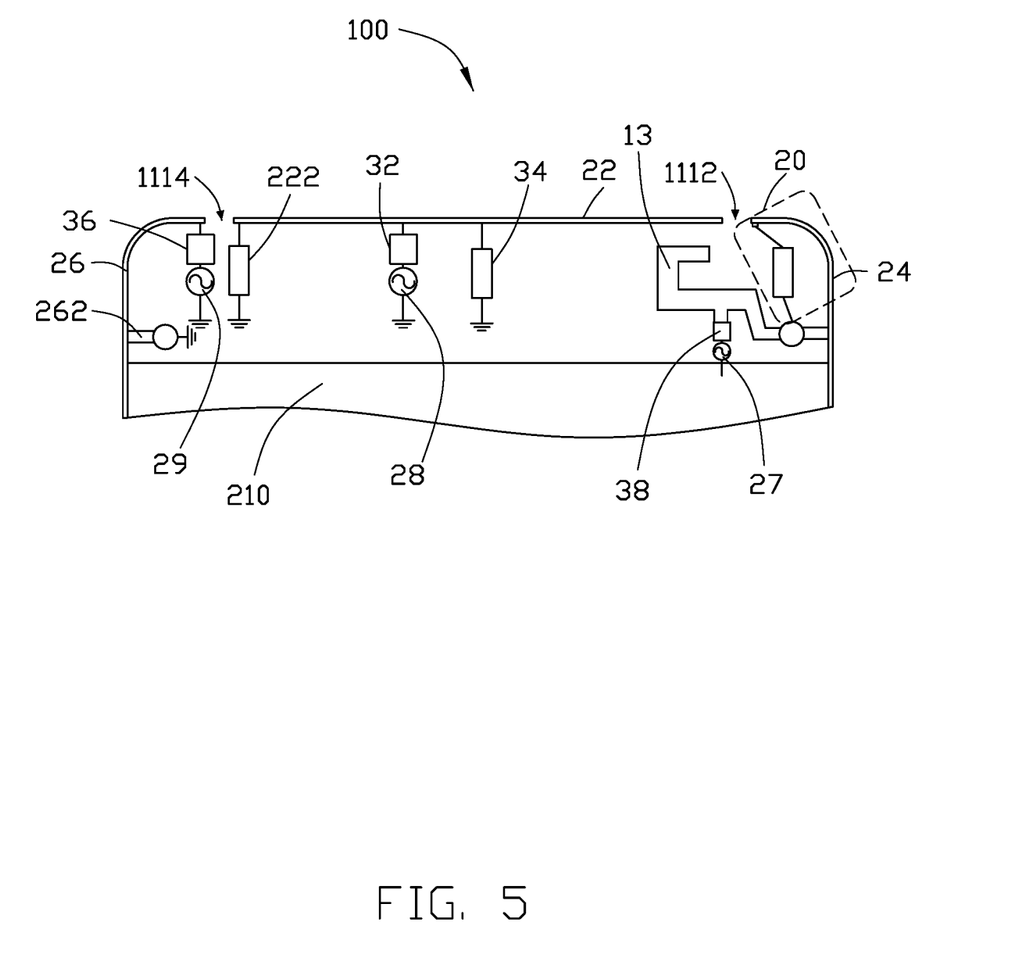
FIG. 5 is a partial plan view of the antenna assembly shown in FIG. 1.

Referring to FIGS. 2 and 3, the antenna assembly 100 includes a housing 11, a radiating portion 13, a feed portion 14, a ground portion 15, a first extending portion 16, a second extending portion 18, a first matching circuit 20 (shown in FIGS. 4 and 5), a second matching circuit 32 (shown in FIG. 5), a third matching circuit 36 (shown in FIG. 5), a fourth matching circuit 38 (shown in FIGS. 4 and 5), and a switch circuit 34 (shown in FIG. 5).

The housing 11 includes a front frame 111, a backboard 112, and a metal frame 113. The front frame 111, the backboard 112, and the metal frame 113 are integrated to form a housing for receiving and holding the wireless communication device 200. The front frame 111 defines an opening (not shown) for receiving a display 201 of the wireless communication device 200. In at least one embodiment, the display 201 includes a glass sheet disposed at the opening. The display plane is substantially parallel to the backboard 112.

The backboard 112 is opposite to the front frame 111. The metal frame 113 is sandwiched between the front frame 111 and the backboard 112. As FIG. 1 shows, no other slot, break line, and/or gap is defined in the backboard 112 except for a hole 204 for exposing a camera lens 202. In at least one embodiment, the backboard 112 is made of non-metallic martial.

The metal frame 113 is positioned between the front frame 111 and the backboard 112. The metal frame 113 is positioned around a periphery of the front frame 111 and a periphery of the backboard 112. The metal frame 113 forms a receiving space 114 together with the display 201, the front frame 111, and the backboard 112. The receiving space 114 can receive a printed circuit board 210, a processing unit (not shown), and other electronic components or modules. In this exemplary embodiment, the electronic components or modules can at least include the camera lens 202. The camera lens 202 is arranged on the printed circuit board 210.

Referring to FIG. 2, the side frame 113 includes a top portion 115, a first side portion 116, and a second side portion 117. The top portion 115 connects the front frame 111 and the backboard 112. The first side portion 116 is spaced apart from and parallel to the second side portion 117. The top portion 115 has first and second ends. The first side portion 116 is connected to the first end of the first frame 111 and the second side portion 117 is connected to the second end of the top portion 115. The first side portion 116 connects the front frame 111 and the backboard 112. The second side portion 117 also connects the front frame 111 and the backboard 112.

The side frame 113 defines a first gap 1112 and a second gap 1114 at the top portion 115. A portion of the side frame 113 is divided by the gaps 1112, 1114 into three portions, which are a first radiating section 24, a second radiating section 22, and a third radiating section 26. A portion of the side frame 113 between the first gap 1112 and the second gap forms the second radiating section 22. In this exemplary embodiment, the first gap 1112 and the second gap 1114 are defined on the top portion 115 of the side frame 113. The first gap 1112 and the second gap 1114 are each disposed adjacent to a corner on opposite ends of the top portion 115, the second radiating section 22 is a straight arm. The first radiating section 24 is formed from the first gap 1112 to the first side portion 116, and crosses an arc corner. The third radiating section 26 is formed from the second gap 1114 to the second side portion 117, and crosses another arc corner. In this exemplary embodiment, the gaps 1112, 1114 are filled with insulating material, for example, plastic, rubber, glass, wood, ceramic, or the like, thereby isolating the second radiating section 22, the first radiating section 24, and the third radiating section 26.

In this exemplary embodiment, except for the gaps 1112, 1114, an upper half portion of the side frame 113 does not define any other slot, break line, and/or gap. That is, the gaps 1112, 1114 defined on the upper half portion of the side frame 113 are the only gaps.

Referring to FIG. 3, the radiating portion 13 is a substantially rectangular metal sheet and is spaced apart from the second radiating section 22. The radiating portion 13 is positioned inside the side frame 113 and is spaced apart from the side frame 113. The radiating portion 13 includes a first protruding portion 132 and a second protruding portion 134. The first protruding portion 132 and the second protruding portion 134 are outward extensions from two adjacent sides of the radiating portion 13. The radiating portion 13 defines two positioning holes 136 for positioning the radiating portion 13 to the printed circuit board 210. In at least one embodiment, one of the positioning holes 136 is defined on the first protruding portion 132, the other positioning hole 136 is defined on an opposite corner of the first protruding portion 132. The radiating portion 13 is adjacent to a side of the camera lens 202, an adjacent side of the camera lens 202 is spaced apart from the second radiating section 22.

The ground portion 15 and the radiating portion 13 are made by integrated molding. The ground portion 15 connects to the second protruding portion 134. The ground portion 15 includes a first arm 152, a second arm 154, and a third arm 156 connected in that order. The first arm 152 is substantially U-shaped, one end of the first arm 152 connects to the second protruding portion 134 and is coplanar with the second protruding portion 134, the other end of the first arm 152 is parallel to the second protruding portion 134 after a U-shaped bend. The second arm 154 connects to the first arm 152 and the third arm 156 at obtuse angles on two opposite ends. The third arm 156 is parallel to the radiating portion 13. The third arm 156 defines a contact hole 157 for securing the radiating portion 13 to the printed circuit board 210.

The feed portion 14 is substantially a U-shaped metal sheet. The feed portion 14 resists between the radiating portion 13 and the printed circuit board 210. One end of the feed portion 14 is electrically connected to a first feeding source 27 (shown in FIG. 4), the other end of the feed portion 14 is electrically connected to the radiating portion 13 through the fourth matching circuit 38. The feed portion 14 can thus feed current into the radiating portion 13 from the first feeding source 27.

The first extending portion 16 and the second extending portion 18 are extensions from the first radiating section 24 towards the radiating portion 13. In detail, the first extending portion 16 is formed by an extension from the end on the top portion 115 of the first radiating section 24 towards the radiating portion 13. The first extending portion 16 is adjacent to the first gap 1112 and is substantially a U-shaped metal sheet. The second extending portion 18 is formed by an extension from the end of the first radiating section 24 on the first side portion 116 towards the second protruding portion 134, and the second extending portion 18 extends to connect to the ground portion 15. The end of the first radiating section 24 forming the second extending portion 18 is electrically connected to a ground of the printed circuit board 210, thus, the ground portion 15 provides grounding for the radiating portion 13 through the second extending portion 18 and the first radiating section 24. In at least one embodiment, the second extending portion 18 may be secured and electrically connected to the contact hole 157 of the third arm 156 of the ground portion 15 through a contact sheet 182 (shown in FIG. 4).

Referring to FIGS. 4 and 5, the first matching circuit 20 includes a load 220. The load 220 is electrically connected between the first extending portion 16 and the second extending portion 18. In at least one embodiment, the load 220 can be a capacitor, an inductor, a resistor, or a combination of at least one capacitor and at least one inductor.

The feed portion 14 feeds current from the first feed source 27 into the radiating portion 13 through the fourth matching circuit 38. The current flows through the radiating portion 13, the ground portion 15, and the contact sheet 182, and further flows in two directions. One direction is flowing through the second extending portion 18 and the first radiating section 24 and so to ground of the printed circuit board 210, the other direction is flowing through the first matching circuit 20, the first extending portion 16, and the first radiating section 24 to ground of the printed circuit board 210. Thus, the feed portion 14, the radiating portion 13, the ground portion 15, the second extending portion 18, the first matching circuit 20, the first extending portion 16, and the first radiating section 24 cooperatively activate a first mode to generate radiation signals in a first frequency band. In this exemplary embodiment, the first mode is a WiFi mode, the first frequency band is a frequency band of about 2400-2480 MHz. The feed portion 14, the radiating portion 13, and the ground portion 15 cooperatively form a WiFi antenna for transmitting and receiving WiFi radiation signals.

Referring to FIG. 5, one end of the second matching circuit 32 is electrically connected to a second feed source 28 of the printed circuit board 210, the other end is electrically connected to the second radiating section 22. One end of the switch circuit 34 is electrically connected to the second radiating section 22, the other end is electrically connected to ground. A junction of the switch circuit 34 and the second radiating section 22 is positioned between the first gap 1112 and a junction of the second matching circuit 32 and the second radiating section 22. The end of the second radiating section 22 adjacent to the second gap 1114 is electrically connected to ground through a load unit 222. In at least one embodiment, the load unit 222 can be a capacitor, an inductor, a resistor, or a combination of at least one capacitor and at least one inductor.

The second radiating section 22 receives current from the second feed source 28 through the second matching circuit 32. The current flows through the second matching circuit 32, enters the second radiating section 22, and flows in two directions. One direction is flowing towards the first gap 1112, the other direction is flowing towards the second gap 1114, flowing through the switch circuit 34 and the load unit 222. Thus, the second matching circuit 32, the second radiating section 22, the switch circuit 34, and the load unit 222 cooperatively form a diversity antenna and activate a second mode to generate radiation signals in a second frequency band. In this exemplary embodiment, the second mode is an LTE-A (Long Term Evolution Advanced) low, middle, and high frequency operation mode, the second frequency band is a frequency band of about 700-960 MHz, 1710-2170 MHz, and 2300-2690 MHz. The arrangement of the second extending portion 18, the first matching circuit 20, and the first extending portion 16, means that the current fed into the first radiating section 24 is not coupled to the second radiating section 22, thus a great isolation is achieved between the first mode and the second mode. In other words, the first matching circuit 20 improves the isolation between the radiating signals of the first frequency band and the radiating signals of the second frequency band. A decreased level of interference is also achieved. In addition, radiation qualities of the antenna assembly 100 are improved.

Referring to FIG. 5, the third radiating section 26 is structurally similar to the first radiating section 24. An end of the third radiating section 26 adjacent to the second gap 1114 is electrically connected to a third feed source 29 of the printed circuit board 210 through the third matching circuit 36. An end of the third radiating section 26 away from the second gap 1114 electrically connects to ground through a third extending portion 262. The third radiating section 26 is symmetrically corresponding to the first radiating section 24. In at least one embodiment, the third radiating section 26 receives current from the third feed source 29 through the third matching circuit 36. The current flows through the third radiating section 26 and the third extending portion 262 to ground. Thus, the third matching circuit 36, the third radiating section 26, and the third extending portion 262 cooperatively activate a third mode to generate radiation signals in a third frequency band. In this exemplary embodiment, the third mode is a Global Positioning System (GPS) mode, the third frequency band is a frequency band of about 1575 MHz. The third matching circuit 36, the third radiating section 26, and the third extending portion 262 cooperatively form a GPS antenna for transmitting and receiving GPS radiation signals.

In at least one embodiment, the middle frame can be a shielding mask for shielding electromagnetic interference arranged on the display 201 facing the backboard 112. The shielding mask or the middle frame can be made of metal material. The shielding mask or the middle frame may connect to the backboard 112 to form a greater ground for the antenna structure 100. In summary, every ground portion directly or indirectly connects to ground.

In at least one embodiment, to obtain preferred antenna characteristics, a width of each of the gaps 1112, 1114 can be 2 millimeters and can be adjusted from 1.5 to 2.5 millimeters, which may further improve antenna characteristics for the radiating sections.

Figure 6:
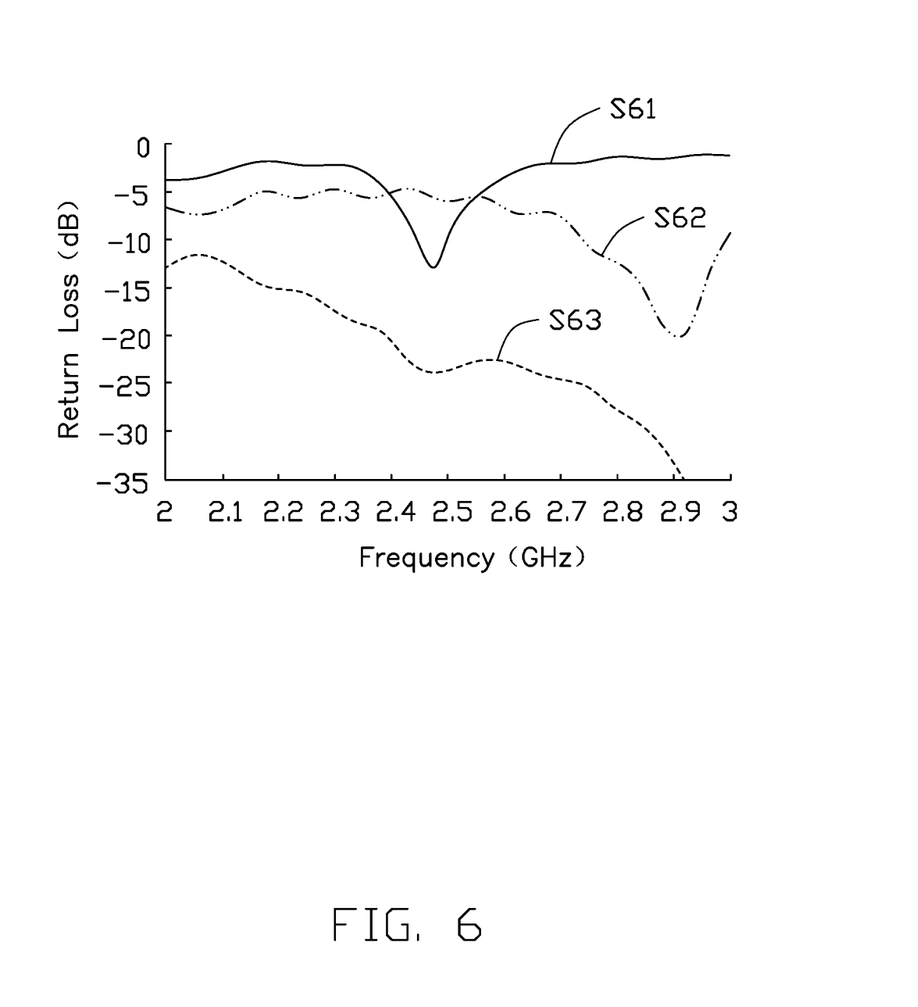
FIG. 6 is a return loss (RL) diagram of the first embodiment of the antenna assembly.

FIG. 6 illustrates a return loss (RL) graph of the antenna assembly 100 in operation. Curve S61 illustrates a return loss of the WiFi antenna, curve S62 illustrates a return loss of the diversity antenna, and curve S63 illustrates return losses of the WiFi antenna and the diversity antenna.

Figure 7:
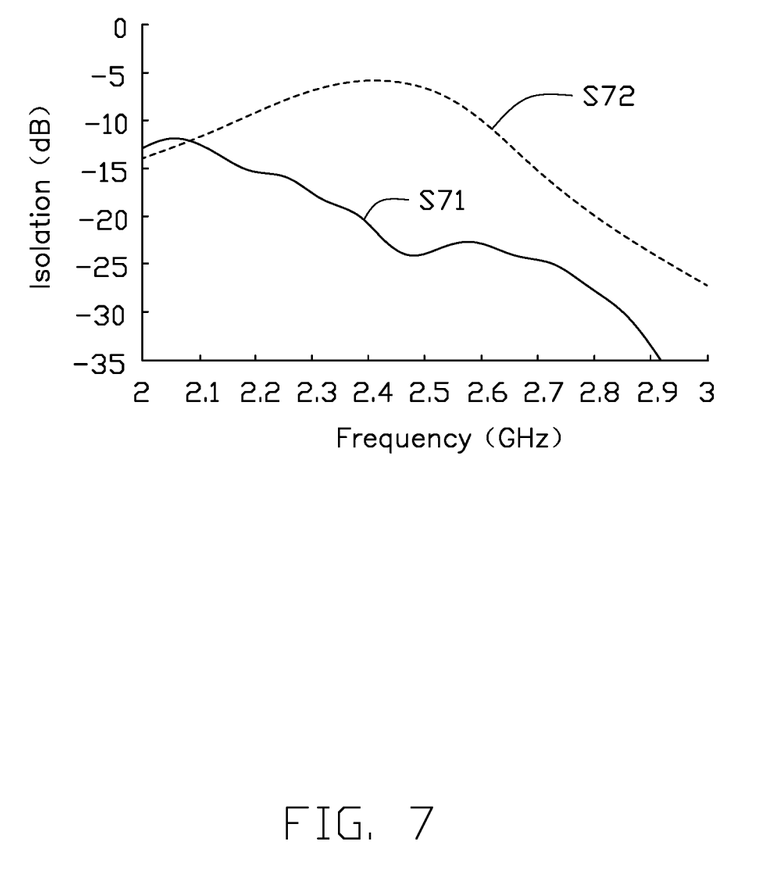
FIG. 7 is an isolation diagram of the first embodiment of the antenna assembly.

FIG. 7 illustrates an isolation graph of the WiFi antenna and the diversity antenna. Curve S71 illustrates an isolation of the WiFi antenna and the diversity antenna in operation, and curve S72 illustrates an isolation of the WiFi antenna and the diversity antenna omitting the first matching circuit 20. Therefore, when the WiFi antenna and the diversity antenna include the first matching circuit 20, the isolation of the WiFi antenna and the diversity antenna is improved.

Figure 8:
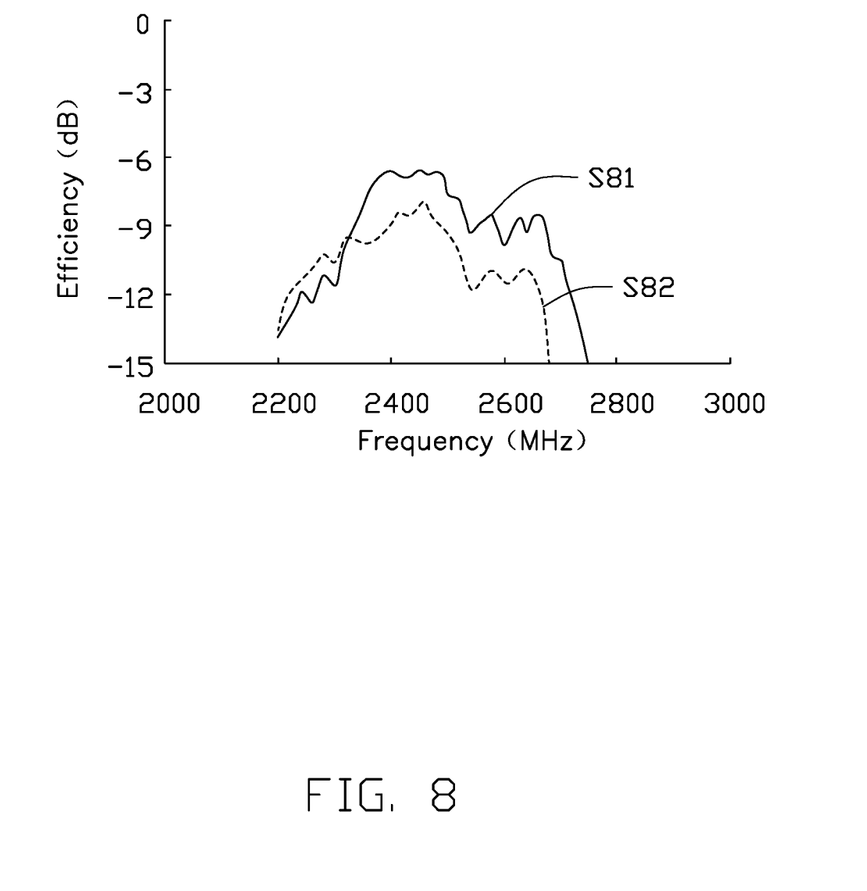
FIG. 8 is an efficiency diagram of the first embodiment of the antenna assembly.

FIG. 8 illustrates a radiating efficiency graph of the antenna assembly 100 in operation. Curve S81 illustrates a radiating efficiency of the WiFi antenna and curve S82 illustrates a radiating efficiency of the WiFi antenna and the diversity antenna without the first matching circuit 20. Therefore, when the WiFi antenna and the diversity antenna include the first matching circuit 20, the radiating efficiency of the antenna assembly 100 is greater than −7 dB. The inclusion of the first matching circuit 20 gives an improvement of 2 dB.

Per FIGS. 6 to 8, when the WiFi antenna and the diversity antenna of the antenna assembly 100 include the first matching circuit 20, isolation and radiating efficiency of the antenna assembly 100 is improved. In addition, the antenna assembly 100 can work at a low frequency band such as LTE-A low frequency band (700-960 MHz), middle frequency band (1710-2170 MHz), and high frequency bands (2300-2690 MHz). The antenna structure 100 can also work at the WiFi frequency band (2400-2480 MHz) and the GPS frequency band (1575 MHz). When the antenna structure 100 operates at these frequency bands, a working frequency satisfies a design of the antenna and also has a good radiating efficiency.

Figure 9:
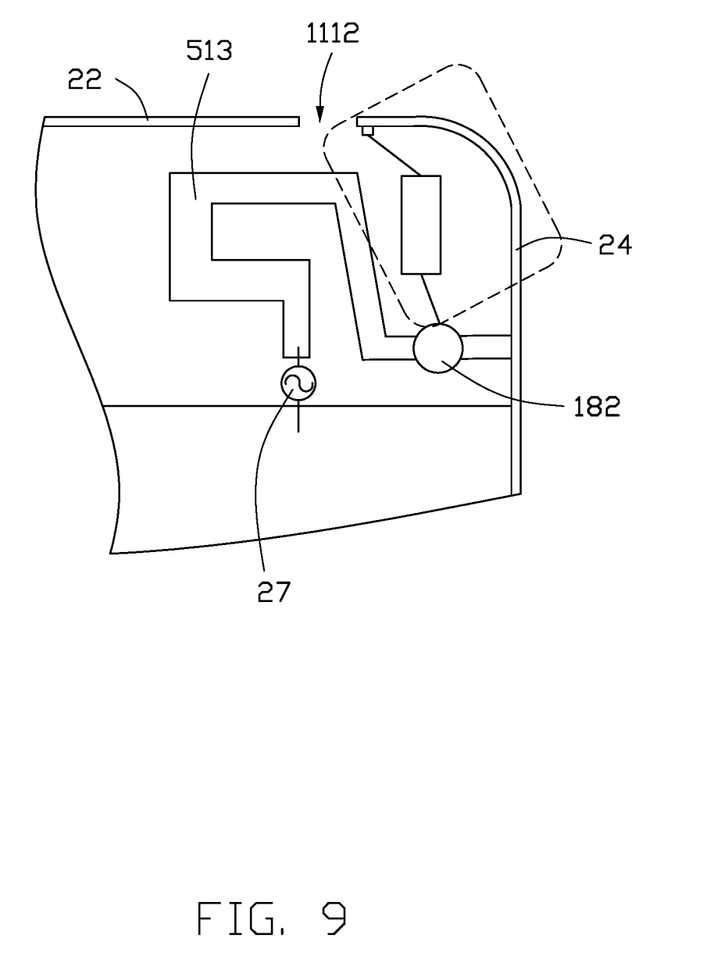
FIG. 9 is a partial plane view of a second embodiment of an antenna assembly.
Figure 10:
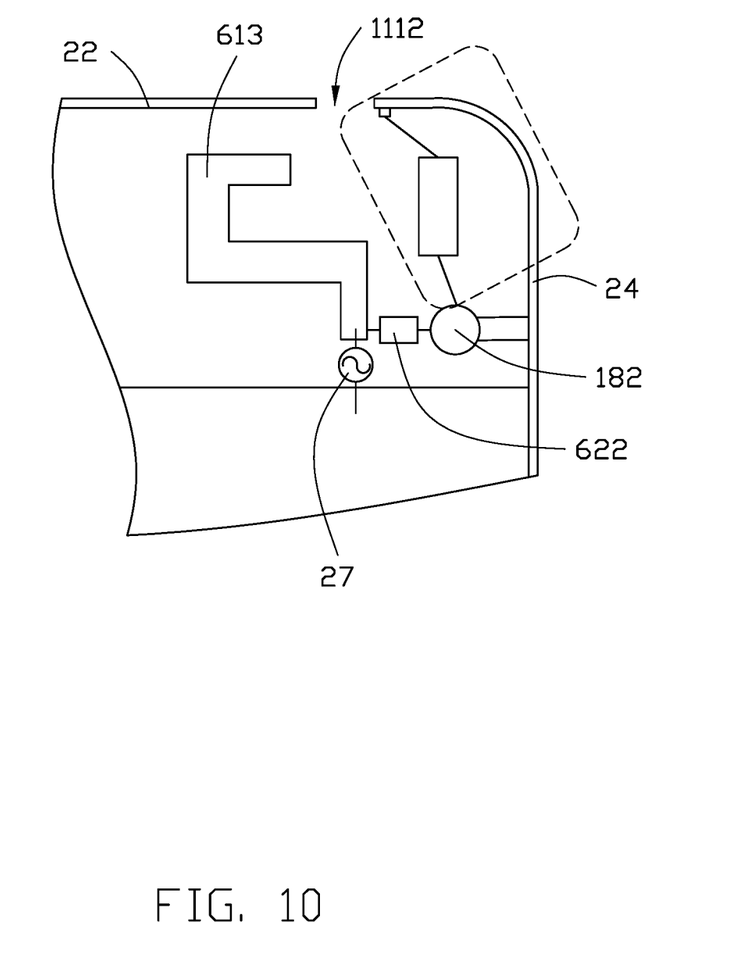
FIG. 10 is a partial plane view of a third embodiment of an antenna assembly.

In at least one embodiment, the WiFi antenna is a planar inverted F antenna (PIFA) formed by the feed portion 14, the radiating portion 13, and the ground portion 15. In other embodiments, the WiFi antenna can be in other forms of antenna besides PIFA antenna. For instance, in a second embodiment, referring to FIG. 9, the WiFi antenna can be a loop antenna. One end of a radiating portion 513 can be electrically connected to the first feed source 27, and the other end electrically connected to the contact sheet 182. In a third embodiment, referring to FIG. 10, the WiFi antenna can be a monopole antenna, one end of a radiating portion 613 being electrically connected to the first feed source 27, and the other end extending so as to be spaced apart from the second radiating section 22. The end of the radiating portion connecting to the first feed source 27 can electrically connect to the contact sheet 182 through a load 622.

The antenna assembly 100 includes the load 220 between the first extending portion 16 and the second extending portion 18, which improves the isolation between the radiating portion 13 and the closely-adjacent second radiating section 22. Mutual interference is decreased, and the radiation quality of the antenna assembly 100 is improved. In addition, the housing 11 presents the gaps only on the side frame 113, the backboard 112 does not define any slot, break line, or gap that divides the backboard 112, which maintains a completeness and appearance of the backboard 112.

It is believed that the embodiments and their advantages will be understood from the foregoing description, and it will be apparent that various changes may be made thereto without departing from the scope of the disclosure or sacrificing all of its advantages, the examples hereinbefore described merely being illustrative embodiments of the disclosure.

What is claimed is:

1. An antenna assembly, comprising:
   a side frame, defining a first gap, to form a first radiating section extending from the first gap to a side portion of the side frame;
   a feed portion;
   a ground portion;
   a radiating portion inside the side frame and connected to the feed portion and the ground portion, the radiating portion spaced apart from the side frame and electrically connected to the first radiating section; and a first matching circuit having one end electrically connected to an end of the first radiating section adjacent to the first gap, and another end electrically connected to the ground portion;

wherein the feed portion feeds current into the radiating portion, two opposites ends of the first radiating section and the first matching circuit to activate radiating signals in a first frequency band.

2. The antenna assembly as claimed in claim 1, further comprising a fourth matching circuit, wherein the fourth matching circuit electrically connects the feed portion and the radiating portion.

3. The antenna assembly as claimed in claim 1, further comprising a first feed source, a second feed source, and a second gap, wherein the feed portion electrically connects to the first feed source to receive current, a portion of the side frame between the first gap and the second gap forms a second radiating section, the radiating portion is spaced apart from the second radiating section, the second radiating section electrically connects to the second feed source and receives current from the second feed source, the current flows through the second radiating section to activate radiating signals in a second frequency band, a frequency of the first frequency band is higher than a frequency of the second frequency band, the first matching circuit improves an isolation between the radiating signals of the first frequency band and the radiating signals of the second frequency band.

4. The antenna assembly as claimed in claim 1, wherein the feed portion, the radiating portion, and the ground portion cooperatively form a planar inverted F antenna, a loop antenna, or a monopole antenna.

5. The antenna assembly as claimed in claim 1, wherein the radiating portion includes a first protruding portion and a second protruding portion formed by outward extensions from two adjacent sides of the radiating portion.

6. The antenna assembly as claimed in claim 3, wherein a portion of the side frame from the second gap to another side portion opposite to the first radiating section forms a third radiating section.

7. The antenna assembly as claimed in claim 5, wherein two opposites ends of the first radiating section respectively forms a first extending portion and a second extending portion, the first extending portion is formed by an extension from the end on a top portion of the first radiating section towards the radiating portion, the first extending portion is adjacent to the first gap, the second extending portion is formed by an extension from the end of the first radiating section on the first side portion towards the second protruding portion, and the second extending portion extends to connect to the ground portion.

8. The antenna assembly as claimed in claim 7, wherein the first matching circuit comprises a load, the load is electrically connected between the first extending portion and the second extending portion, the load is a capacitor, an inductor, a resistor, or a combination of at least one capacitor and at least one inductor.

9. The antenna assembly as claimed in claim 8, wherein the feed portion, the radiating portion, the ground portion, the second extending portion, the first matching circuit, the first extending portion, and the first radiating section cooperatively activate a first mode to generate radiation signals in the first frequency band, the first mode is a WiFi mode.

10. The antenna assembly as claimed in claim 3, further comprising a second matching circuit, a switch circuit, and a load unit, wherein one end of the second matching circuit electrically connects to the second feed source, the other end of the second matching circuit electrically connects to the second radiating section; one end of the switch circuit electrically connects to the second radiating section, the other end of the switch circuit electrically connects to ground; a junction of the switch circuit and the second radiating section is positioned between the first gap and a junction of the second matching circuit and the second radiating section; the end of the second radiating section adjacent to the second gap is electrically connected to ground through the load unit; the load unit is a capacitor, an inductor, a resistor, or a combination of at least one capacitor and at least one inductor.

11. The antenna assembly as claimed in claim 10, wherein the second radiating section receives current from the second feed source through the second matching circuit; the current flows through the second matching circuit and enters the second radiating section, and further flows in two directions; one direction is flowing towards the first gap; the other direction is flowing towards the second gap and flowing through the switch circuit and the load unit; the second matching circuit, the second radiating section, the switch circuit, and the load unit cooperatively form a diversity antenna and activate a second mode to generate radiation signals in the second frequency band; the second mode is an LTE-A (Long Term Evolution Advanced) low, middle, and high frequency operation mode.

12. The antenna assembly as claimed in claim 6, further comprising a third feed source and a third matching circuit, wherein an end of the third radiating section adjacent to the second gap is electrically connected to the third feed source through the third matching circuit; an end of the third radiating section away from the second gap electrically connects to ground through a third extending portion; the third radiating section is symmetrically corresponding to the first radiating section.

13. The antenna assembly as claimed in claim 12, wherein the third radiating section receives current from the third feed source through the third matching circuit, the current flows through the third radiating section and the third extending portion to ground; the third matching circuit, the third radiating section, and the third extending portion cooperatively activate a third mode to generate radiation signals in a third frequency band, the third mode is a Global Positioning System (GPS) mode.

14. A wireless communication device comprising:
   a side frame, defining a first gap, to form a first radiating section from the first gap to a side portion of the side frame;
   a feed portion;
   a ground portion;
   a radiating portion inside the side frame and connected to the feed portion and the ground portion, the radiating portion spaced apart from the side frame and electrically connected to the first radiating section; and
   a first matching circuit having one end electrically connected to an end of the first radiating section adjacent to the first gap, and another end electrically connected to the ground portion;
   wherein the feed portion feeds current into the radiating portion, two opposites ends of the first radiating section, and the first matching circuit to activate radiating signals in a first frequency band.

15. The wireless communication device as claimed in claim 14, wherein the further comprising a fourth matching circuit, wherein the fourth matching circuit electrically connects the feed portion and the radiating portion.

16. The wireless communication device as claimed in claim 14, further comprising a first feed source, a second feed source, and a second gap, wherein the feed portion electrically connects to the first feed source to receive current, a portion of the side frame between the first gap and the second gap forms a second radiating section, the radiating portion is spaced apart from the second radiating section, the second radiating section electrically connects to the second feed source and receives current from the second feed source, the current flows through the second radiating section to activate radiating signals in a second frequency band, a frequency of the first frequency band is higher than a frequency of the second frequency band, the first matching circuit improves an isolation between the radiating signals of the first frequency band and the radiating signals of the second frequency band; a portion of the side frame from the second gap to another side portion opposite to the first radiating section forms a third radiating section.

17. The wireless communication device as claimed in claim 16, further comprising a second matching circuit, a switch circuit, and a load unit, wherein one end of the second matching circuit electrically connects to the second feed source, the other end of the second matching circuit electrically connects to the second radiating section; one end of the switch circuit electrically connects to the second radiating section, the other end of the switch circuit electrically connects to ground; a junction of the switch circuit and the second radiating section is positioned between the first gap and a junction of the second matching circuit and the second radiating section; the end of the second radiating section adjacent to the second gap is electrically connected to ground through the load unit; the load unit is a capacitor, an inductor, a resistor, or a combination of at least one capacitor and at least one inductor.

18. The wireless communication device as claimed in claim 17, wherein the second radiating section receives current from the second feed source through the second matching circuit; the current flows through the second matching circuit and enters the second radiating section, and further flows in two directions; one direction is flowing towards the first gap; the other direction is flowing towards the second gap and flowing through the switch circuit and the load unit; the second matching circuit, the second radiating section, the switch circuit, and the load unit cooperatively form a diversity antenna and activate a second mode to generate radiation signals in the second frequency band; the second mode is an LTE-A (Long Term Evolution Advanced) low, middle, and high frequency operation mode.

19. The wireless communication device as claimed in claim 16, further comprising a third feed source and a third matching circuit, wherein an end of the third radiating section adjacent to the second gap is electrically connected to the third feed source through the third matching circuit; an end of the third radiating section away from the second gap electrically connects to ground through a third extending portion.

20. The wireless communication device as claimed in claim 19, wherein the third radiating section receives current from the third feed source through the third matching circuit, the current flows through the third radiating section and the third extending portion to ground; the third matching circuit, the third radiating section, and the third extending portion cooperatively activate a third mode to generate radiation signals in a third frequency band, the third mode is a Global Positioning System (GPS) mode.

* * * * *